United States Patent
Yamaguchi et al.

(10) Patent No.: US 6,612,218 B2
(45) Date of Patent: Sep. 2, 2003

(54) WORKING VEHICLE WITH A WORKING IMPLEMENT DISPLACEABLE BY A HYDRAULIC ACTUATOR

(75) Inventors: Tetsuo Yamaguchi, Sakai (JP); Akio Inamori, Izumi (JP)

(73) Assignee: Kubota Corporation (JP)

( * ) Notice: Subject to any disclaimer, the term of this patent is extended or adjusted under 35 U.S.C. 154(b) by 63 days.

(21) Appl. No.: 09/795,676

(22) Filed: Feb. 28, 2001

(65) Prior Publication Data

US 2002/0104430 A1 Aug. 8, 2002

(30) Foreign Application Priority Data

Feb. 2, 2001 (JP) .................................. 2001-026696

(51) Int. Cl.⁷ .................................................. F15B 9/09
(52) U.S. Cl. ...................................................... 91/363 R
(58) Field of Search ................................ 91/363 R, 433

(56) References Cited

U.S. PATENT DOCUMENTS 5,513,551 A 5/1996 Morishita

FOREIGN PATENT DOCUMENTS

| EP | 0362402 | 3/1989 |
|---|---|---|
| EP | 0372899 | 12/1989 |
| EP | 0614016 | 8/1993 |
| JP | 356702 | 3/1991 |
| JP | 06249208 | 9/1994 |
| JP | 9184504 | 7/1997 |

*Primary Examiner*—Edward K. Look
*Assistant Examiner*—Michael Leslie
(74) *Attorney, Agent, or Firm*—Webb Ziesenheim Logsdon Orkin & Hanson PC

(57) ABSTRACT

A working vehicle comprises a working implement (20) supported by the working vehicle to be displaceable by a hydraulic actuator (1), and a controller (16) for generating a control output signal for controlling a position of the working implement in response to a control input signal, with reference to predetermined control characteristics. The control characteristics include at least a first control characteristic (Qs') and a second control characteristic (Qs") different from each other. The controller refers to the second control characteristic for generating the control output signal when the control input signal results from a variation in a set signal from a setter (15; 17S) for setting a target level of the working implement, and refers to the second control characteristic for generating the control output signal when the control input signal results from a variation in a detection signal from a displacement detecting sensor for detecting a displacement of the working implement.

22 Claims, 11 Drawing Sheets

WORKING VEHICLE WITH A WORKING IMPLEMENT DISPLACEABLE BY A HYDRAULIC ACTUATOR

BACKGROUND OF THE INVENTION

1. Field of the Invention

This invention relates to a working vehicle having a working implement displaceable relative to the working vehicle by a hydraulic actuator, and a controller for generating a control output signal for controlling a position of the working implement in response to control input signals, with reference to predetermined control characteristics.

2. Description of the Related Art

In a typical construction of a working vehicle with a working implement of the type noted above, the controller receives, as control input signals, a set signal from a setter for setting a target height of the working implement, and a detection signal from a positional detecting sensor for detecting a displacement level of the working implement. In response to the control input signals, the controller generates a control output signal with reference to a table of control characteristics, and outputs the control output signal for driving a hydraulic actuator to maintain the working implement at the target level.

When the working implement deviates from the target level under the influence of some turbulence, for example, a control is carried out to return the working implement to the target level. At this time, the corrective control is carried out based on a starting flow rate table stored as predetermined control characteristics. The control characteristics provided by this starting flow rate table are set to increase the flow rate of pressure oil supplied to the hydraulic actuator with the passage of time from a point of starting the control.

This type of working vehicle is considered here, as one example, to have a boom sprayer acting as the working implement (see FIG. 12).

A large working vehicle may include, as the working implement, a storage tank forming part of the boom sprayer and having a capacity of 1300 liters for storing a liquefied fertilizer, water or the like. It is necessary to raise and lower the storage tank with the hydraulic actuator. During an operation to supply water to the storage tank, for example, the storage tank grows heavier with progress of the water supplying operation. When pressure oil inadvertently leaks from the lift cylinder, the working implement descends beyond a dead zone of a set height. This triggers a control for returning the working implement to a target height.

The control is carried out with reference to the starting flow rate table (control characteristics) as noted above. This starting flow rate table is set to supply a large quantity per unit time. As a result, the boom sprayer acting as the working implement is driven rapidly to return the working implement to the target height. Then, the working implement is moved with acceleration to agitate the water in the storage tank, resulting in an inconvenience of the water supply overflowing a supply opening.

SUMMARY OF THE INVENTION

The object of this invention is to provide a working vehicle capable of controlling displacement of a working implement, while avoiding inconveniences due to an excessive displacing speed, particularly in performing a corrective control to place the implement at a target level which may be required as a result of leakage of pressure oil from a lift cylinder or the like.

The above object is fulfilled, according to this invention, by a working vehicle comprising a working implement supported by the working vehicle to be displaceable by a hydraulic actuator, and a controller for generating a control output signal for controlling a position of the working implement in response to a control input signal, with reference to predetermined control characteristics, wherein the control characteristics include at least a first control characteristic and a second control characteristic different from each other, the controller selecting a control characteristic to refer to, according to a type of the control input signal.

This construction provides a plurality of different control characteristics, from which an optimal one may be selected according to a control situation. That is, a flow rate characteristic for supplying pressure oil to the hydraulic actuator may be selected appropriately according to a factor requiring movement of the working implement.

For example, the second control characteristic may have a higher time-dependent rate of increase in a quantity of pressure oil supplied to the hydraulic actuator than the first control characteristic. A difference between a set level and an actual level of the working implement is small in the case of pressure oil leakage. A displacement control of the working implement arising from such a factor may be carried out by controlling a starting flow rate based on the first control characteristic having a low rate of increase in pressure oil supply. Generally, when the operator changes the level of the working implement at will, a large difference exists between a set level and an actual level of the working implement. In such a case, a starting flow rate may be controlled based on the second control characteristic having a high rate of increase in pressure oil supply.

In a preferred embodiment by this invention, the controller refers to the second control characteristic for generating the control output signal when the control input signal results from a variation in a set signal from a setter for setting a target level of the working implement, and refers to the second control characteristic for generating the control output signal when the control input signal results from a variation in a detection signal from a displacement detecting sensor for detecting a displacement of the working implement. In a displacement control of the working implement caused by an operation of the setter, a starting flow rate is controlled based on the second control characteristic having a high rate of increase in pressure oil supply.

That is, for correcting a level of the working implement, a plurality of flow rate control characteristics are made available for selective use with reference to a factor requiring the correction of the level of the working implement. Where a pressure oil leakage from the lift cylinder is the cause, the hydraulic actuator is controlled based on the first control characteristic having a low rate of increase in pressure oil supply, to realize a gentle displacement. On the other hand, where a changing operation of the setter is the cause, the level of the working implement is changed at the operator's will. The hydraulic actuator is controlled based on the second control characteristic having a high rate of increase in pressure oil supply, to realize a rapid displacement.

In a preferred embodiment of this invention, the setter for setting a target level of the working implement is a position setter for setting a height of the working implement relative to the working vehicle. When the position setter is operated, it often is the case that the working implement is moved to a large extent upward or downward. Thus, the control is based on the starting flow rate characteristic having a high increase rate of pressure oil supply. The control is carried out in agreement with the operational feeling of the operator.

In another preferred embodiment of this invention, the setter for setting a target level of the working implement is an upper limit setter for setting an upper limit position of the working implement relative to the working vehicle, the working implement being forcibly displaced to the upper limit position set by the upper limit setter. When the upper limit position relative to the vehicle body is changed by operating the upper limit setter, the working implement must be raised or lowered to a large extent. In this case, the control is based on the starting flow rate characteristic having a high increase rate of pressure oil supply. A quick control is carried out in agreement with the operational feeling of the operator.

In a further preferred embodiment of this invention, the controller refers to the second control characteristic for generating the control output signal when the control input signal results from a variation in a set signal from a draft setter for setting a reference operational load for the working implement, and refers also to the second control characteristic for generating the control output signal when the control input signal results from a variation in a detection signal from a load detecting sensor for detecting an actual operational load acting on the working implement.

What is known as draft control is a control for maintaining a set operational load acting on the working implement. When an operational load exceeding the set load is received, this state must be terminated promptly to protect the working implement. Whether or not the excessive operational load is caused by an operation of the setter, the working implement is raised or lowered by a control based on the control characteristic (i.e. the second control characteristic) having a high increase rate, to eliminate the overload promptly.

In a further preferred embodiment of this invention, the control characteristics include a first control characteristic having a predetermined time-dependent rate of increase in a quantity of pressure oil supplied to the hydraulic actuator, a second control characteristic having a higher time-dependent rate of increase than the first control characteristic, and a deflection control characteristic set to increase the quantity of pressure oil supplied to the hydraulic actuator with a deviation between a set signal from a setter for setting a target position of the working implement and a detection signal from a position detecting sensor for detecting a position of the working implement, and wherein the controller selects one of the first and second control characteristics according to a type of the control input signal, compares the one of the first and second control characteristics selected with the deflection control characteristic, and generates the control output signal with reference to a value for supplying a smaller quantity of pressure oil to the hydraulic actuator.

This construction gives priority to the deflection control, depending on a control input signal. With the deflection control also, the working implement is displaced quickly and efficiently when the above deviation as an amount of control input is large. When the deviation is small, the working implement is displaced smoothly to avoid overshooting.

Other features and advantages of this invention will be apparent from the following description of the embodiment to be taken with reference to the drawings.

DESCRIPTION OF THE PREFERRED EMBODIMENTS

An embodiment of this invention will be described hereinafter with reference to the drawings.

Figure 1:
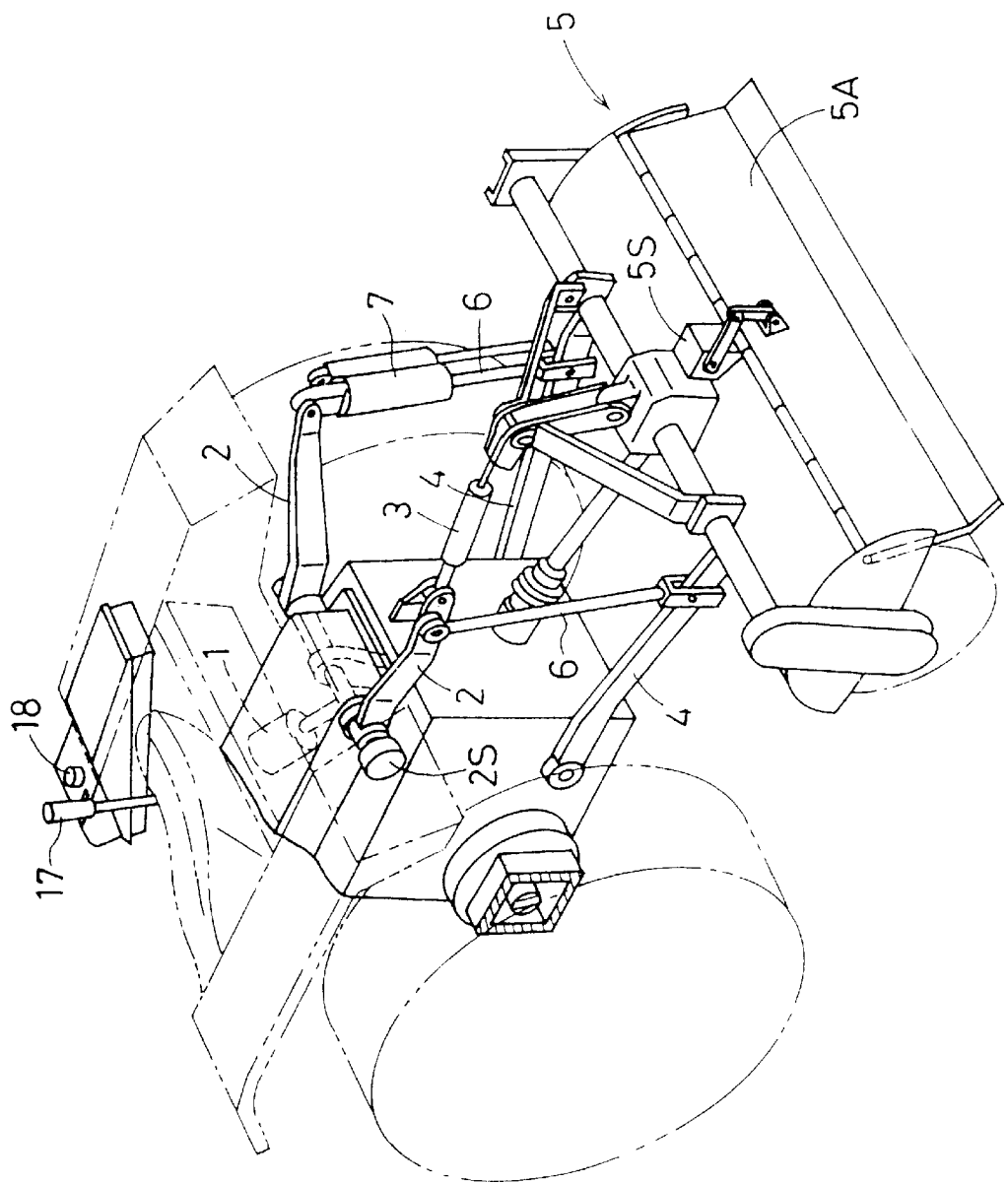
FIG. 1 is a perspective view of a rear portion of a tractor acting as one example of working vehicles according to this invention.

FIG. 1 shows a rear portion of a tractor acting as a working vehicle. This tractor is used chiefly in agriculture. The tractor includes a lift cylinder 1 (one example of hydraulic actuators) in the rear portion thereof for raising and lowering a pair of right and left lift arms 2. A rotary plow 5 (one example of working implements) is connected to the tractor through a three-point link mechanism having a single top link 3 and a pair of right and left lower links 4. The lower links 4 are suspended from the lift arms 2 through lift rods 6, whereby the rotary plow 5 is vertically movable by the driving force of lift cylinder 1. The right lift rod 6 has a double-acting rolling cylinder 7 mounted thereof to be extendible and contractible to cause rolling of the rotary plow 5.

Figure 12:
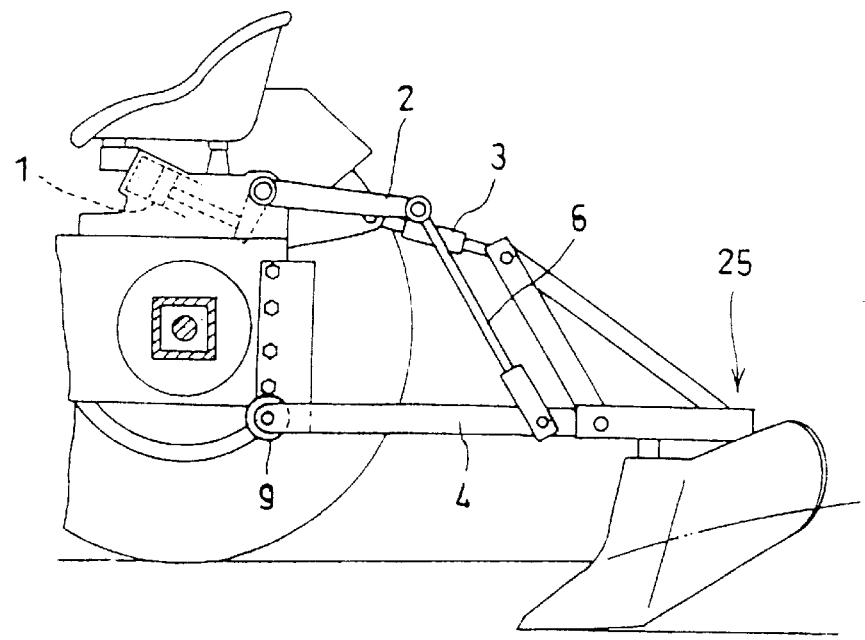
FIG. 12 is a side view of a plowing implement acting as one example of working implements.
Figure 13:
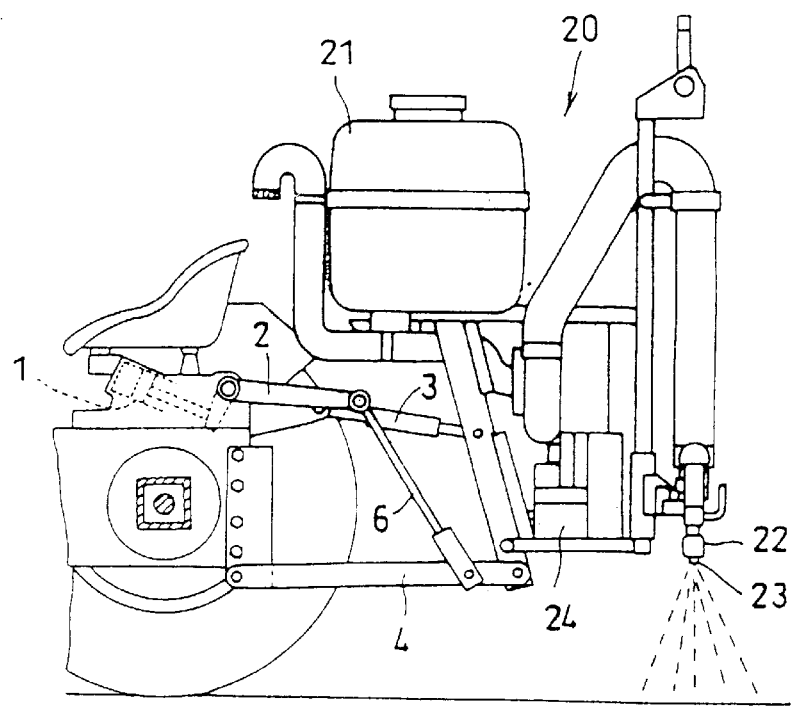
FIG. 13 is a side view of a boom sprayer acting as another example of working implements.

Working implements attachable to the three-point link mechanism include, besides the rotary plow 5, a plowing implement 25 as shown in FIG. 12 and a boom spray 20 for spraying a fertilizer as shown in FIG. 13. The plowing implement 25 and boom sprayer 20 will be described hereinafter. The description will be made centering on the rotary plow 5 first.

Figure 2:
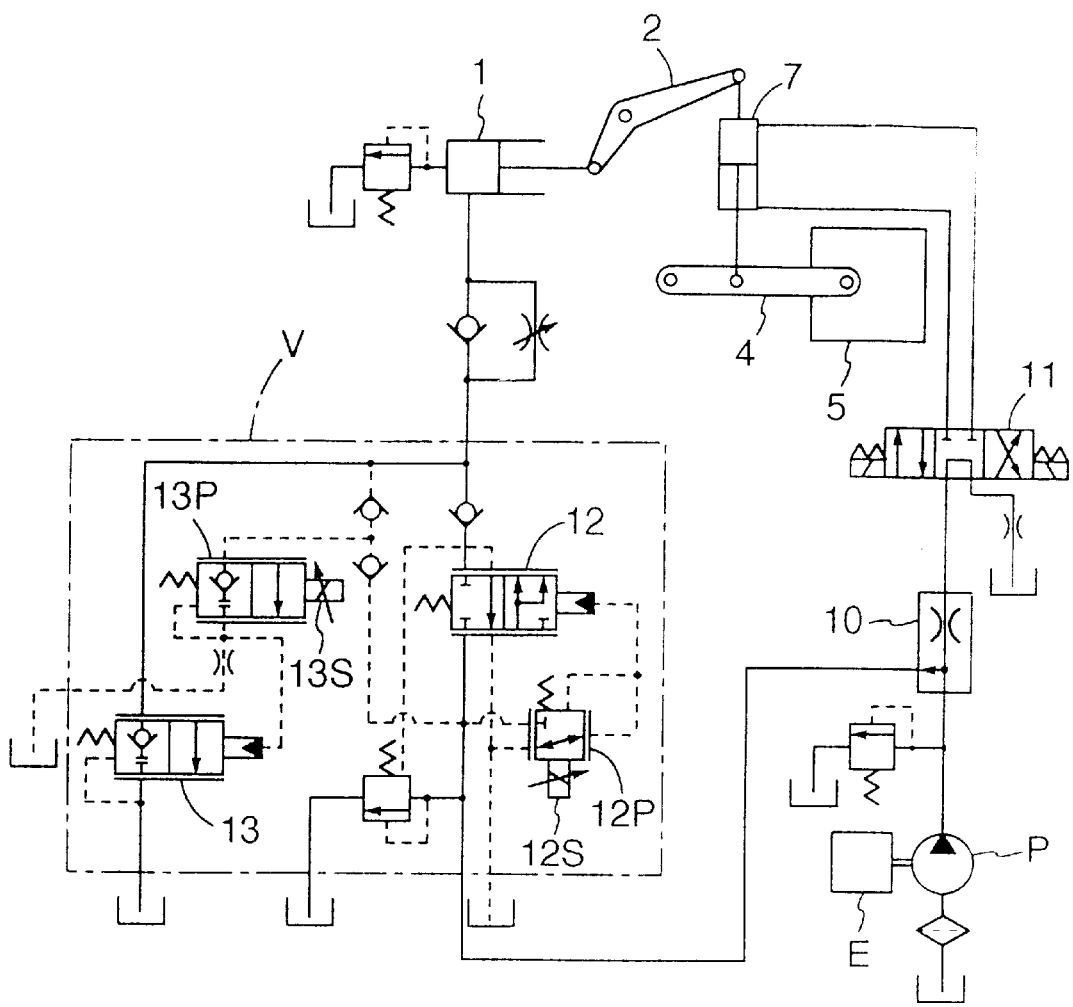
FIG. 2 is a hydraulic circuit diagram.

As shown in FIG. 2, a hydraulic system is provided for operating the lift cylinder 1 and rolling cylinder 7.

The hydraulic system includes a flow priority valve 10 disposed on an oil line extending from a hydraulic pump P driven by an engine E. The flow priority valve 10 branches the oil line to supply a fixed quantity of control flow to a rolling control valve 11 of the electromagnetically operable type, and to supply a surplus flow to a raising and lowering control valve V of the electromagnetic proportional type. The rolling control valve 11 is switchable by electric signals to a contracting position for contracting the rolling cylinder 7, an extending position for extending the rolling cylinder 7, and a neutral position for preventing the extension and contraction.

The raising and lowering control valve V includes a raising control valve 12 for supplying pressure oil to the lift cylinder 1, a raising pilot valve 12P for operating the raising control valve 12 with pilot pressure, a lowering control valve 13 for draining pressure oil from the lift cylinder 1, and a lowering pilot valve 13P for operating the lowering control valve 13 with pilot pressure. The raising pilot valve 12P and lowering pilot valve 13P are opened to varied degrees in proportion to currents supplied to respective electromagnetic solenoids 12S and 13S, to vary the pilot pressure, thereby adjusting opening degrees of the raising control valve 12 and lowering control valve 13. Thus, the raising and lowering control valve V is an electromagnetic proportional control valve.

With this construction, when raising the rotary plow 5, a current is supplied in an adjusted amount to the electromagnetic solenoid 12S of raising pilot valve 12P. The raising pilot valve 12P is opened in proportion to the current value, to vary the pilot pressure applied from the raising pilot valve 12P to the raising control valve 12, whereby the raising control valve 12 is opened to a degree proportional to the current value. As a result, pressure oil is supplied to the lift cylinder 1 in a quantity proportional to the valve opening degree, which determines a rising speed of the rotary plow 5. Similarly, when lowering the rotary plow 5, a current is supplied in an adjusted amount to the electromagnetic solenoid 13S of lowering pilot valve 13P. The lowering pilot valve 13P is opened in proportion to the current value, to vary the pilot pressure applied from the lowering pilot valve 13P to the lowering control valve 13, whereby the lowering control valve 12 is opened to a degree proportional to the current value. As a result, pressure oil is drained from the lift cylinder 1 in a quantity proportional to the valve opening degree, which determines a lowering speed of the rotary plow 5.

Figure 3:
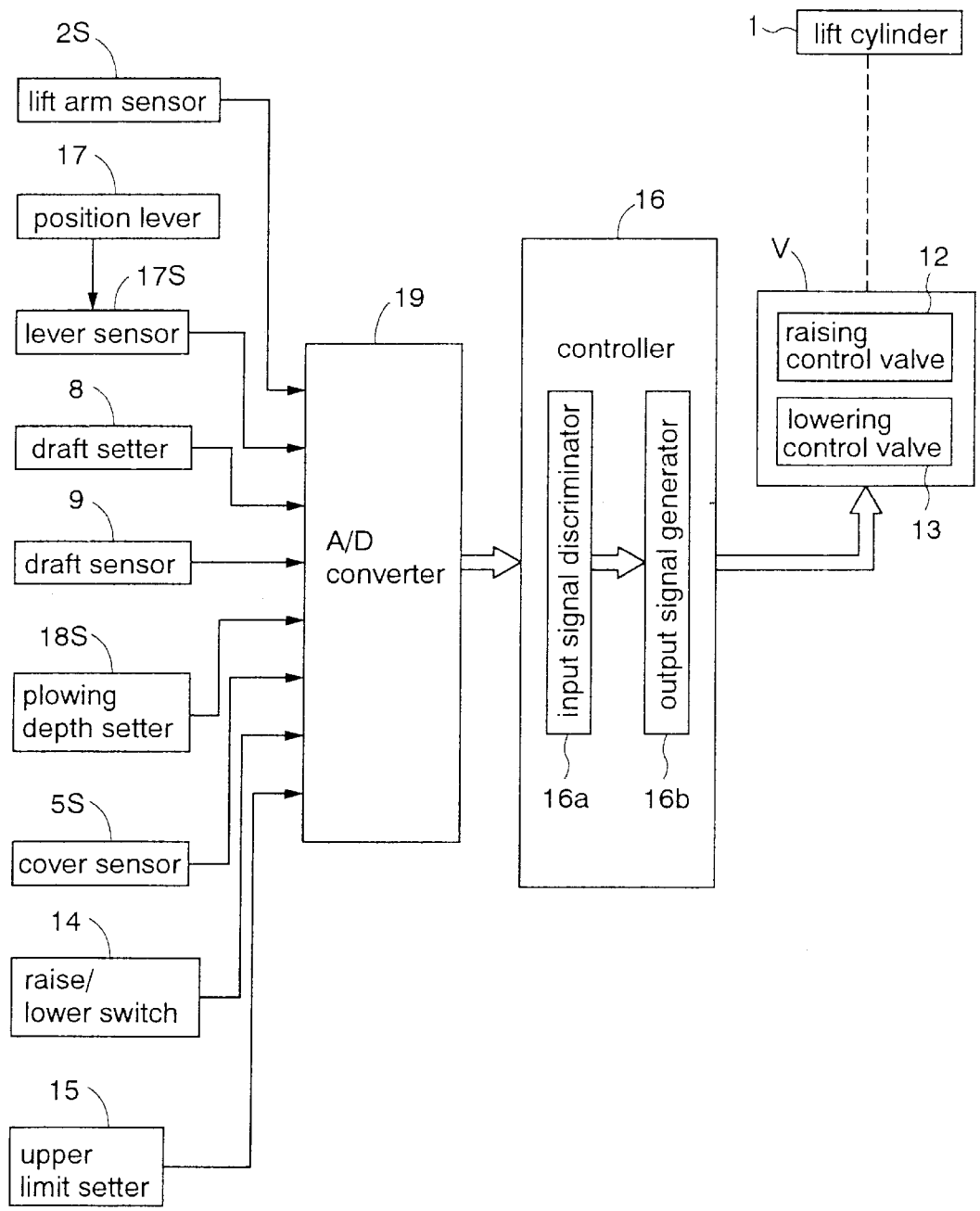
FIG. 3 is a control block diagram.

As shown in FIG. 3, a controller 16 with a microprocessor has an input system for receiving signals through an analog-to-digital converter 19 from various devices disposed on the vehicle body. These devices include a lever sensor 17S of the potentiometer type for measuring an operative position of a position lever 17 (one example of setter for setting a target amount of operation), a lift arm sensor 2S of the potentiometer type (one example of operative position detecting sensor for detecting an operative position of the hydraulic actuator) for measuring a pivoting amount of the lift arm 2, a plowing depth setter 18S of the potentiometer type (one example of setter for setting a target amount of operation) operable by a dial 18 for setting a plowing depth of rotary plow 5, and a cover sensor 5S of the potentiometer type (one example of operative position detecting sensor for detecting an operative position of the hydraulic actuator) for measuring a plowing depth of rotary plow 5 by measuring a pivoting amount of a rear cover 5A of rotary plow 5. An electric system is formed from supplying currents from the controller 16 to the electromagnetic solenoids 12S and 13S of raising pilot valve 12P and lowering pilot valve 13P.

The controller 16 has a microcomputer as a central component thereof, with various functions provided by software, hardware or both. The functions particularly important to this invention are performed by an input signal discriminating device 16a for determining, from the control input signals received through the above input system, sources and causes of the input signals, and an output signal generating device 16b for determining starting flow rate curves (FIGS. 4 and 10) as control characteristics to be referred to, based on results of discrimination by the input signal discriminating device 16a, and generating control output signals for controlling the position of the working implement in accordance with the control input signals.

In this agricultural tractor, two types of feedback control are carried out. One is a position control for vertically moving the rotary plow 5 until a rough agreement is attained between a target height relative to the vehicle body of the rotary plow 5 set by the lever sensor 17S and an actual height relative to the vehicle body of the rotary plow 5 measured by the lift arm sensor 2S. The other is an automatic plowing depth control for vertically moving the rotary plow 5 for attaining a rough agreement between a target plowing depth set by the plowing depth setter 18 and an actual plowing depth of the rotary plow 5 measured by the cover sensor 5S.

Figure 5:
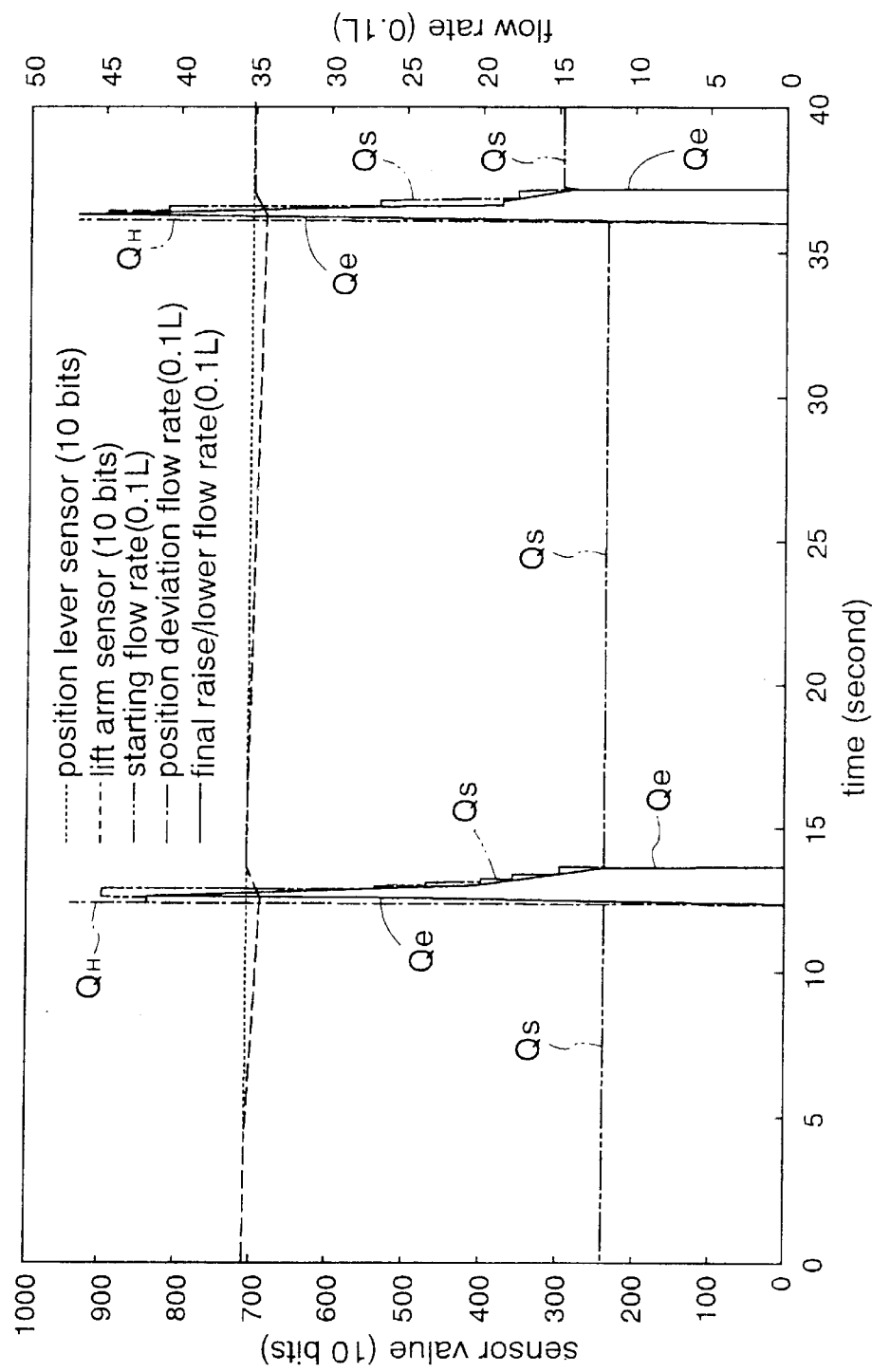
FIG. 5 is a view showing quantities of pressure oil supplied to a lift arm in a position control performed in time of a deviation between a position lever sensor and a lift arm sensor where a steep slope starting flow rate is employed.
Figure 6:
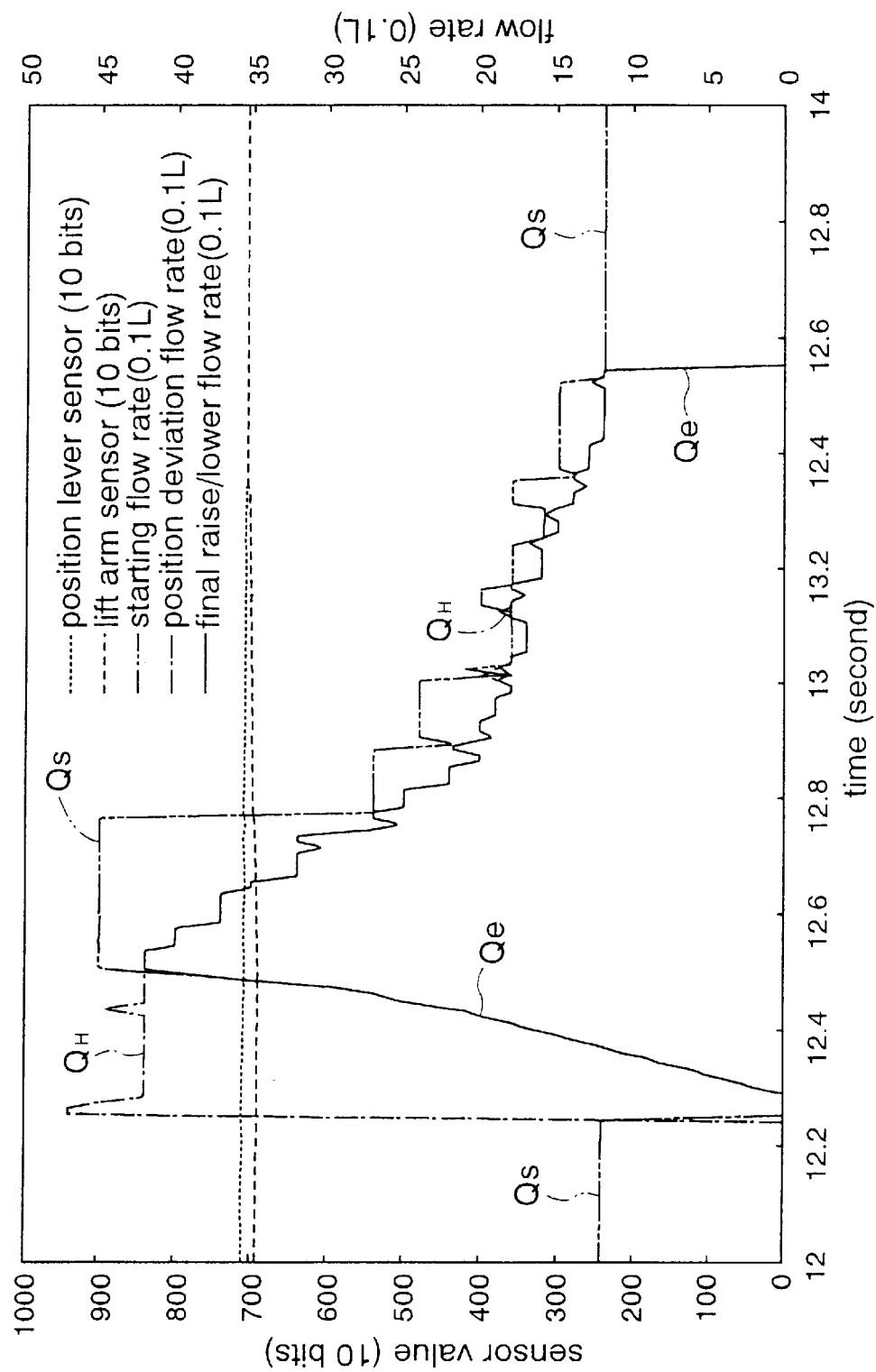
FIG. 6 is an enlarge view of a control portion of FIG. 5.
Figure 9:
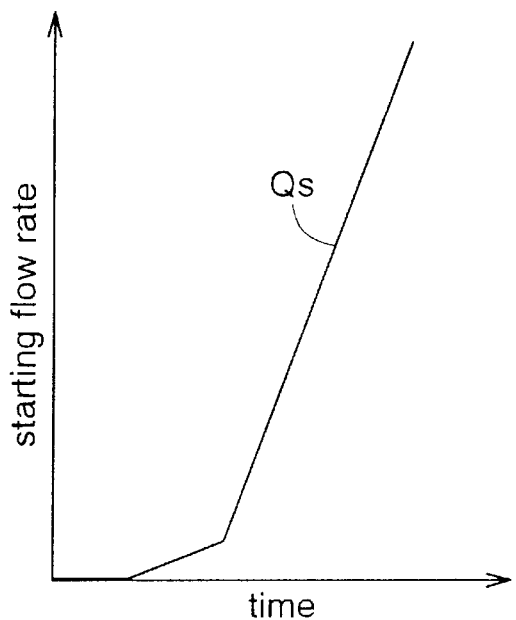
FIG. 9 is a view showing a time-dependent change in a starting flow rate.
Figure 10:
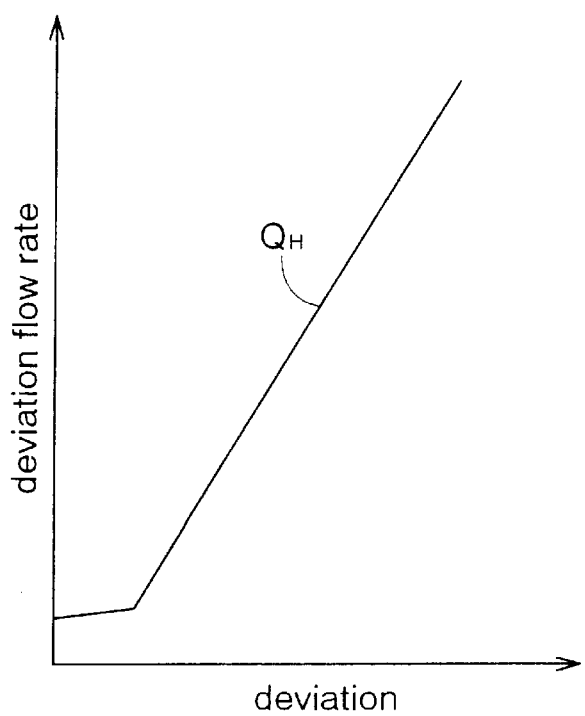
FIG. 10 is a view showing a relationship between deviation flow rate and deflection.

The position control will be described next. As shown in FIG. 9, a starting flow rate QS is selected along a characteristic line with a flow rate increasing with time. As shown in FIG. 10, a deviation flow rate QH is selected along a characteristic line to increase with deviation, based on a set signal of a setting system such as the lever sensor 17S and a detection signal of a feedback system such as the lift arm sensor 2S. In carrying out a basic control with these two flow rates, as shown in FIG. 6 which is an enlargement of a control portion of what is shown in FIG. 5, the control is started with the starting flow rate QS which is slightly higher than 0, while the deviation flow rate QH high due to a large deviation between a value set by the position lever 17 and a detection value by the lift arm sensor 2S. This is because the control by the controller 16 adopt, as a control output, the lower of the starting flow rate QS and the deviation flow rate QH.

FIG. 5 is a graph showing results of a test conducted with the boom sprayer 20 attached as the working implement, in which pressure oil is artificially leaked from the lift cylinder 1 to lower the boom sprayer 20 beyond a dead zone of a set height.

Figure 4:
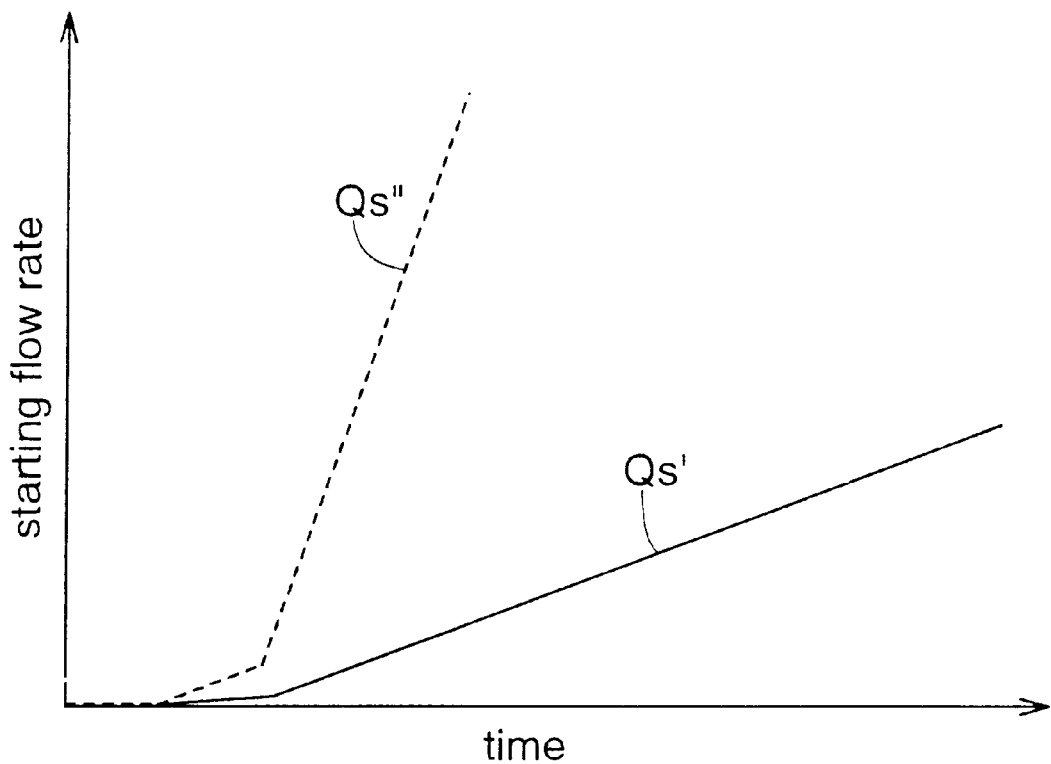
FIG. 4 is a view showing two starting flow rates with different characteristics.

That is, the working implement is set to a predetermined height by the position control, and pressure oil was artificially leaked from the lift cylinder 1. The working implement descends beyond the dead zone, and a corrective control is started at this point of time to return the working implement to the predetermined height. As shown in FIGS. 5 and 6, the control is started upon lapse of 12.2 seconds, with the starting flow rate QS lower than the deviation flow rate QH. The lift cylinder 1 is extended by gradually increasing the starting flow rate QS for 0.21 seconds to the 12.5 second point when the starting flow rate QS exceeds the deviation flow rate QH. Thereafter the control is continued with the deviation flow rate QH lower than the starting flow rate QS. Both the deviation flow rate QH and starting flow rate QS are decreased gradually. Thus, a final raise/lower flow rate Qe representing an operating flow rate corresponds to the starting flow rate QS in the first half of operation, and to the deviation flow rate QH in the second half after 0.21 seconds. As shown in FIG. 4, the starting flow rate QS used in this control rises in a sharp gradient, i.e. based on a second control characteristic (a second starting flow rate curve table).

That is, as control characteristics to be referred to in calculating the starting flow rate QS, two types with different increase gradients are provided, which are a first control characteristic with a gentle gradient (first starting flow rate curve table) and the second control characteristic with a sharp gradient (second starting flow rate curve table). The first characteristic with the gentle gradient is used when raising or lowering the working implement slowly. The second characteristic with the sharp gradient is used when raising or lowering the working implement quickly. The starting flow rate determined with reference to the first control characteristic is denoted by QS', and that determined with reference to the second control characteristic is denoted by QS". The graphs shown in FIGS. 5 and 6 show results of the test conducted with the starting flow rate QS" determined with reference to the control characteristic with the sharp gradient. Where the boom sprayer 20 is attached as the working implement, the implement could be moved vertically at excessive speed during an operation to correct its height, resulting in an inconvenience of water scattering out of a storage tank 21 of the boom sprayer 20.

Figure 7:
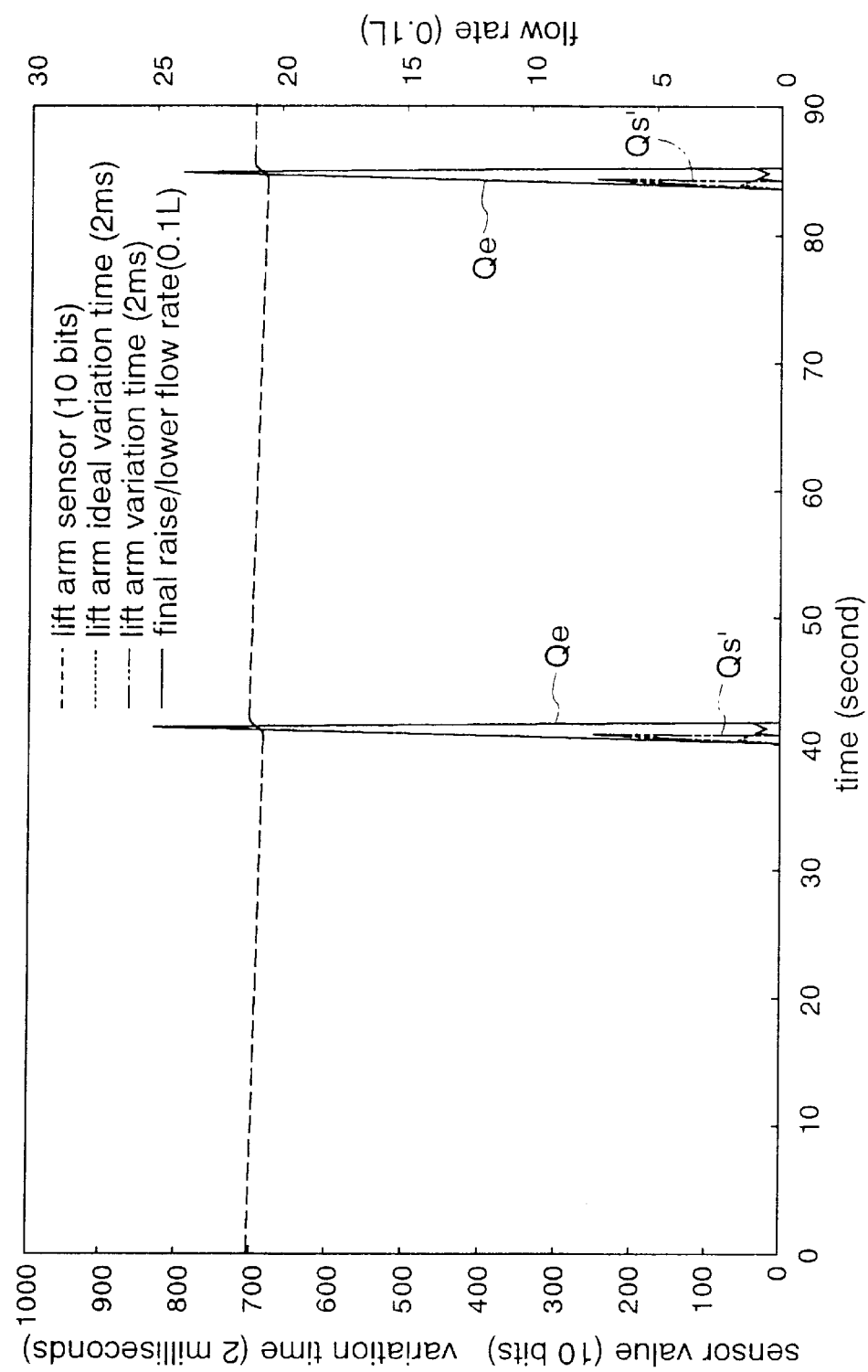
FIG. 7 is a view showing quantities of pressure oil supplied to the lift arm in a position control performed in time of a deviation between the position lever sensor and the lift arm sensor where a gentle slope starting flow rate is employed.
Figure 8:
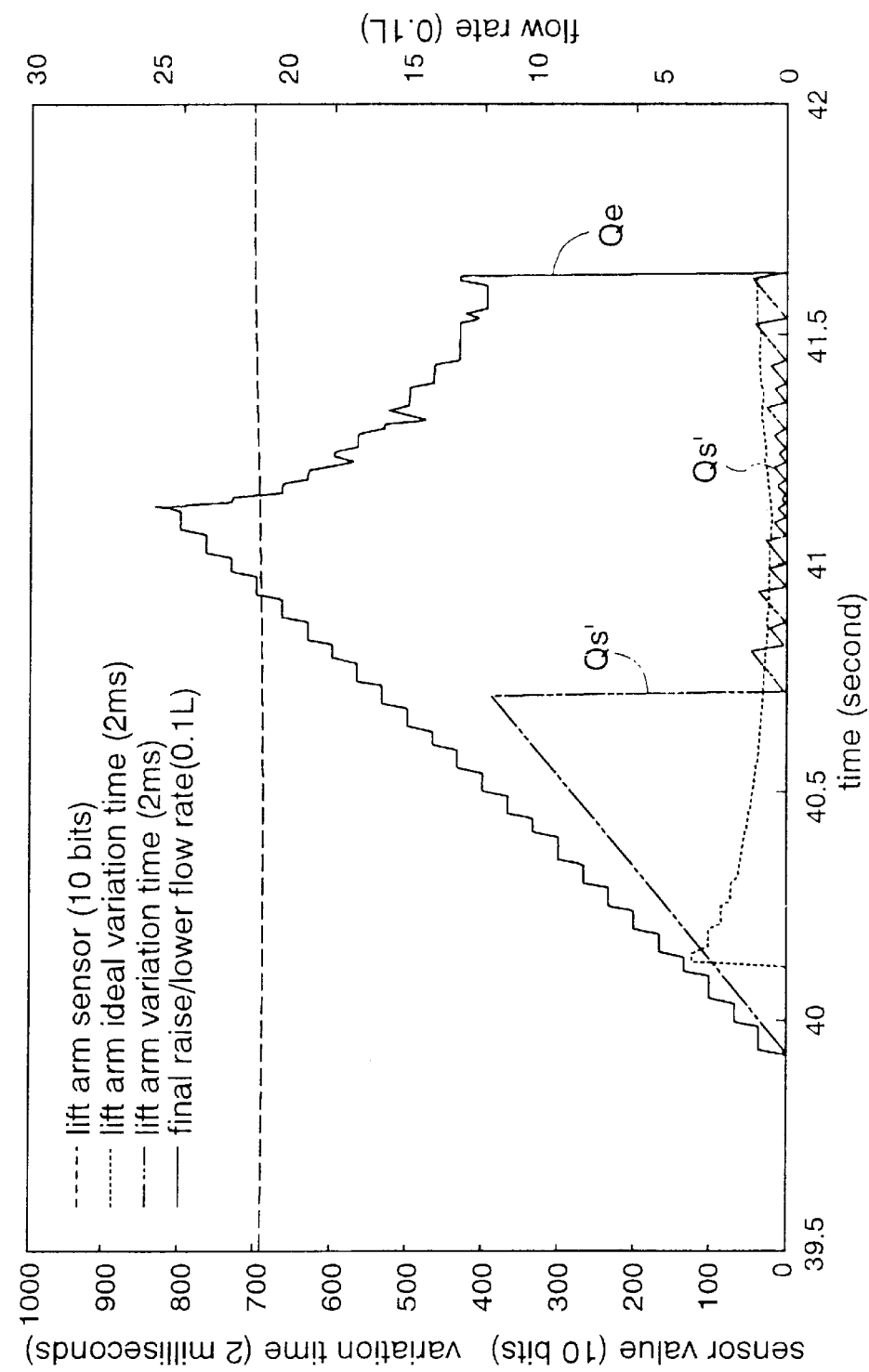
FIG. 8 is an enlarge view of a control portion of FIG. 7.

FIGS. 7 and 8 show results of a test conducted with the starting flow rate QS' determined with reference to the control characteristic with the gentle gradient (first control characteristic) in place of the starting flow rate QS" determined with reference to the control characteristic with the sharp gradient (second control characteristic). Here, since the starting flow rate QS' increases gradually, the flow rate required for the vertical movement decreases from 4.2 liters to 2.5 liters, and it takes from 0.21 seconds to 1.2 to supply this quantity. Thus, height is corrected by vertically moving the working implement slowly.

Figure 11:
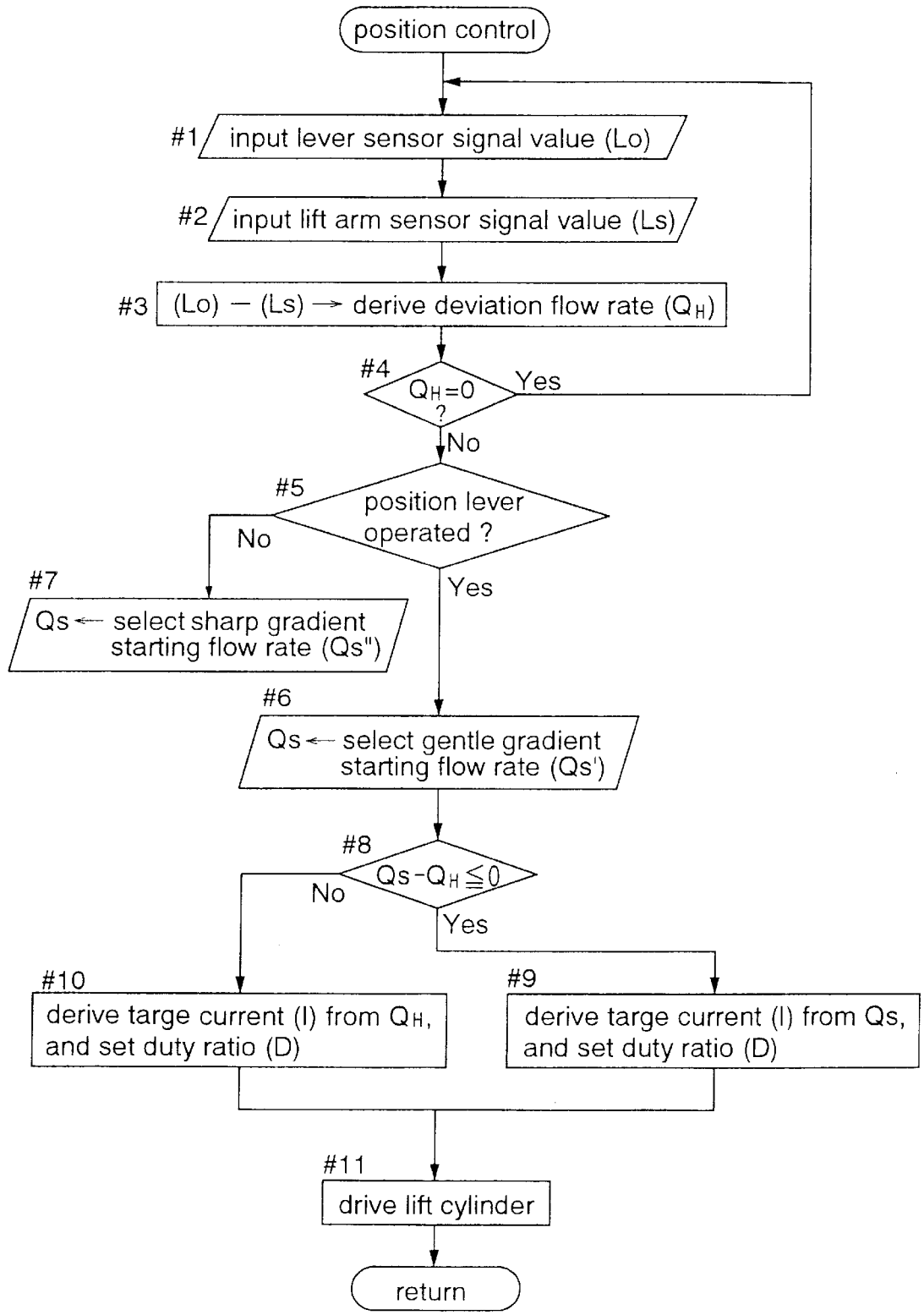
FIG. 11 is a flow chart of a control for selecting between the gentle slope starting flow rate and steep slope starting flow rate.

Next, based on the test results, the position control will be described in which a selection is made between the two starting flow rates QS' and QS". As shown in FIG. 5 and the flow chart of FIG. 11, when a deviation occurs between a set value (signal value) Lo of position lever sensor 17S and a detection value (signal value) LS of lift arm sensor 2S, whether the position lever 17 has been operated is determined from a change rate of the signal value Lo of lever sensor 17S (#1-#5). After determining whether the signal value of lever sensor 17S has changed, a selection is made between the two starting flow rates QS' and QS". That is, a change in the signal value of lever sensor 17S indicates that the driver has operated the position lever 17. When the position lever 17 has been operated, a selection is made of the starting flow rate QS" determined with reference to the control characteristic with the sharp gradient (#7). A change in the signal value of lift arm sensor 2S may be found while an operation of the position lever 17 is not confirmed. This indicates a leak of pressure oil from the lift cylinder 1 as noted hereinbefore. Then, a control is carried out with the starting flow rate QS' determined with reference to the control characteristic with the gentle gradient (#6).

After selecting the control characteristic to be referred to, i.e. the starting flow rate QS' or QS", the starting flow rate is compared with the deviation flow rate QH and a control is started with the lower one of the flow rates. For the flow rate QS (QS' or QS") or QH selected, a target current I for driving the raising and lowering control valve V is derived, and a duty ration D required for producing the target current I is set. The control valve V is operated to drive the lift cylinder 1.

The control mode based on the selection of the starting flow rate determined by employing one of the two control characteristics noted above, i.e. the starting flow rate QS' or QS" is applicable to a draft control and an automatic plowing depth control in a plowing operation, the latter being effected by a forcible raising and lowering switch 14. In the draft control, the plowing implement 25 is raised or lowered to attain an agreement between a value set by a draft setter 8 of the potentiometer type disposed on a driving platform and detection value of a draft sensor 9 disposed on a lower link 4 to detect an operational resistance acting on the plowing implement 25.

The draft control, which requires an overload to be avoided, does not use the starting flow rate QS' with the gentle gradient, but uses the starting flow rate QS" with the sharp gradient.

In the automatic plowing depth control, the forcible raising and lowering switch 14is operated to raise and lower the rotary plow 5 repeatedly. An upper limit setter 15 is provided to set an upper limit for the rotary plow 5. Thus, when the upper limit is changed by operating the upper limit setter 15, the working implement is moved vertically by using the starting flow rate QS" with the sharp gradient to correct the upper limit.

The boom sprayer 20 will be described next. As shown in FIG. 13, the boom sprayer 20 includes a storage tank 21 for storing a fertilizer, and a spraying pump 24 for feeding the fertilizer from the storage tank 21 to a spraying boom 22 and spraying the fertilizer through a spray nozzle 23. The position control for the boom sprayer 20 is carried out according to the flow chart of FIG. 11.

(Other Embodiments)

1. This invention is not limited to the above embodiment, but is applicable to an automatic plowing depth control and a rolling control, for example. The invention is applicable also to a draft control for raising and lowering a working implement such as a plow.

2. In the foregoing embodiment, pressure oil is supplied to the lift cylinder 1 by employing the lower of the starting flow rate QS and deviation flow rate QH. The control may be carried out with the starting flow rate QS only.

3. The sensor for detecting an operative position of the hydraulic actuator such as lift cylinders 1 relies on the movement of lift arms 2 driven by the actuator. Instead, a stroke sensor or the like may be used, which detects the movement of the hydraulic actuator itself.

What is claimed is:

1. A working vehicle comprising:
   a working implement supported by the working vehicle to be displaceable by a hydraulic actuator; and
   a controller for generating a control output signal for controlling a position of said working implement in response to a control input signal, with reference to predetermined control characteristics;
   wherein said control characteristics include at least a first control characteristic having a predetermined time-dependent rate of increase in a quantity of pressure oil supplied to said hydraulic actuator, and a second control characteristic having a higher time-dependent rate of increase than said first control characteristic,
   said controller refers to said second control characteristic for generating said control output signal, if said control input signal results from a variation in a set signal from a setter for setting a target level of said working implement, and
   said controller refers to said first control characteristic for generating said control output signal, if said control input signal results from a variation in a detection signal from a displacement detecting sensor for detecting a displacement of said working implement.

2. A working vehicle as defined in claim 1, wherein said setter is a position setter for setting a height of said working implement relative to the working vehicle.

3. A working vehicle as defined in claim 1, wherein said setter is an upper limit setter for setting an upper limit position of said working implement relative to the working vehicle, said working implement being forcibly displaced to said upper limit position set by said upper limit setter.

4. A working vehicle as defined in claim 1, wherein said controller refers to said second control characteristic for generating said control output signal when said control input signal results from a variation in a set signal from a draft setter for setting a reference operational load for said working implement, and refers also to said second control characteristic for generating said control output signal when said control input signal results from a variation in a detection signal from a load detecting sensor for detecting an actual operational load acting on said working implement.

5. A working vehicle comprising:
a working implement supported by the working vehicle to be displaceable by a hydraulic actuator; and
a controller for generating a control output signal for controlling a position of said working implement in response to a control input signal, with reference to predetermined control characteristics;
wherein said control characteristics include a first control characteristic having a predetermined time-dependent rate of increase in a quantity of pressure oil supplied to said hydraulic actuator, a second control characteristic having a higher time-dependent rate of increase than said first control characteristic, and a deflection control characteristic set to increase the quantity of pressure oil supplied to said hydraulic actuator with a deviation between a set signal from a setter for setting a target position of said working implement and a detection signal from a position detecting sensor for detecting a position of said working implement; and
wherein said controller selects one of said first and second control characteristics according to a type of said control input signal, compares said one of said first and second control characteristics selected with said deviation control characteristic, and generates said control output signal with reference to a value for supplying a smaller quantity of pressure oil to said hydraulic actuator.

6. A working vehicle as defined in claim 5, wherein:
said controller refers to said second control characteristic for generating said control output signal, if said control input signal results from a variation in a set signal from said setter for setting a target level of said working implement; and
said controller refers to said first control characteristics for generating said control output signal, if said control input signal results from a variation in a detection signal from a displacement detecting sensor for detecting a displacement of said working implement.

7. A working vehicle as defined in claim 5, wherein said setter is a position setter for setting a height of said working implement relative to the working vehicle.

8. A working vehicle as defined in claim 5, wherein said setter is an upper limit setter for setting an upper limit position of said working implement relative to the working vehicle, said working implement being forcibly displaced to said upper limit position set by said upper limit setter.

9. A working vehicle comprising:
a working implement supported by the working vehicle to be displaceable by a hydraulic actuator; and
a controller for generating a control output signal for controlling a position of said working implement in response to a control input signal, with reference to predetermined control characteristics;
wherein said control characteristics include at least a first control characteristic having a predetermined time-dependent rate of increase in a quantity of pressure oil supplied to said hydraulic actuator, and a second control characteristic having a higher time-dependent rate of increase than said first control characteristic, and wherein said controller refers to said second control characteristic for generating said control output signal, if said control input signal results from a variation in a set signal from a draft setter for setting a reference operational load for said working implement, and
said controller refers also to said second control characteristic for generating said control output signal, if said control input signal results from a variation in a detection signal from a load detecting sensor for detecting an actual operational load acting on said working implement.

10. A working vehicle as defined in claim 9, wherein said setter is a position setter for setting a height of said working implement relative to the working vehicle.

11. A working vehicle as defined in claim 9, wherein said setter is an upper limit setter for setting an upper limit position of said working implement relative to the working vehicle, said working implement being forcibly displaced to said upper limit position set by said upper limit setter.

12. A fluid power system for use in a working vehicle having a working implement supported by the working vehicle, said system comprising:
a hydraulic actuator; and
a controller for generating a control output signal for controlling a position of the hydraulic actuator for positioning the working implement, the controller generating a control input signal with reference to predetermined control characteristics;
wherein said control characteristics include at least a first control characteristic having a predetermined time-dependent rate of increase in a quantity of pressure oil supplied to said hydraulic actuator, and a second control characteristic having a higher time-dependent rate of increase than said first control characteristic;
wherein said controller refers to said second control characteristic for generating said control output signal, if said control input signal results from a variation in a set signal from a setter for setting a target level of said working implement, and
said controller refers to said first control characteristic for generating said control output signal, if said control input signal results from a variation in a detection signal from a displacement detecting sensor for detecting a displacement of said working implement.

13. A fluid power system as defined in claim 12, wherein said setter is a position setter for setting a height of said working implement relative to the working vehicle.

14. A fluid power system as defined in claim 12, wherein said setter is an upper limit setter for setting an upper limit position of said working implement relative to the working vehicle, said working implement being forcibly displaced to said upper limit position set by said upper limit setter.

15. A fluid power system as defined in claim 12, wherein said controller refers to said second control characteristic for generating said control output signal when said control input signal results from a variation in a set signal from a draft setter for setting a reference operational load for said working implement, and refers also to said second control characteristic for generating said control output signal when said control input signal results from a variation ma detection signal from a load detecting sensor for detecting an actual operational load acting on said working implement.

16. A fluid power system for use in a working vehicle having a working implement supported by the working vehicle, said system comprising:
a hydraulic actuator; and a controller for generating a control output signal for controlling a position of the hydraulic actuator for positioning the working implement, the controller generating a control input signal with reference to predetermined control characteristics;

wherein said control characteristics include a first control characteristic having a predetermined time-dependent rate of increase in a quantity of pressure oil supplied to said hydraulic actuator, a second control characteristic having a higher time-dependent rate of increase than said first control characteristic, and a deflection control characteristic set to increase the quantity of pressure oil supplied to said hydraulic actuator with a deviation between a set signal from a setter for setting a target position of said working implement and a detection signal from a position detecting sensor for detecting a position of said working implement; and said controller selects one of said first and second control characteristic according to a type of said control input signal, compares said one of said first and second control characteristics selected with said deviation control characteristic, and generates said control output signal with reference to a value for supplying a smaller quantity of pressure oil to said hydraulic actuator.

17. A fluid power system as defined in claim 16, wherein:

said controller refers to said second control characteristic for generating said control output signal, if said control input signal results from a variation in a set signal from a setter for setting a target level of said working implement, and said controller refers to said first control characteristic for generating said control output signal, if said control input signal results from a variation in a detection signal from a displacement detecting sensor for detecting a displacement of said working implement.

18. A fluid power system as defined in claim 16, wherein said setter is a position setter for setting a height of said working implement relative to the working vehicle.

19. A fluid power system as defined in claim 16, wherein said setter is an upper limit setter for setting an upper limit position of said working implement relative to the working vehicle, said working implement being forcibly displaced to said upper limit position set by said upper limit setter.

20. A fluid power system for use in a working vehicle having a working implement supported by the working vehicle, said system comprising:

a hydraulic actuator; and a controller for generating a control output signal for controlling a position of the hydraulic actuator for positioning the working implement, the controller generating a control input signal with reference to predetermined control characteristics;

wherein said control characteristics include at least a first control characteristic having a predetermined time-dependent rate of increase in a quantity of pressure oil supplied to said hydraulic actuator, and a second control characteristic having a higher time-dependent rate of increase than said first control characteristic, and said controller refers to said second control characteristic for generating said control output signal, if said control input signal results from a variation in a set signal from a draft setter for setting a reference operational load for said working implement, and said controller refers also to said second control characteristic for generating said control output signal, if said control input signal results from a variation in a detection signal from a load detecting sensor for detecting an actual operational load acting on said working implement.

21. A fluid power system as defined in claim 20, wherein said setter is a position setter for setting a height of said working implement relative to the working vehicle.

22. A fluid power system as defined in claim 20, wherein said setter is an upper limit setter for setting an upper limit position of said working implement relative to the working vehicle, said working implement being forcibly displaced to said upper limit position set by said upper limit setter.

* * * * *

UNITED STATES PATENT AND TRADEMARK OFFICE
CERTIFICATE OF CORRECTION

PATENT NO. : 6,612,218 B2
DATED : September 2, 2003
INVENTOR(S) : Tetsuo Yamaguchi et al.

It is certified that error appears in the above-identified patent and that said Letters Patent is hereby corrected as shown below:

Column 8,
Line 4, "14is" should read -- 14 is --.

Column 10,
Line 61, "ma" should read -- in a --.

Signed and Sealed this

Sixth Day of January, 2004

JAMES E. ROGAN
*Director of the United States Patent and Trademark Office*